(12) United States Patent
Adsule et al.

(10) Patent No.: US 12,282,888 B2
(45) Date of Patent: Apr. 22, 2025

(54) AUTONOMOUS DELIVERY TO A DYNAMIC LOCATION

(71) Applicant: T-Mobile USA, Inc., Bellevue, WA (US)

(72) Inventors: Dharmendra Adsule, Bellevue, WA (US); Sathyaraj Kolandasamy, Prosper, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/320,629

(22) Filed: May 19, 2023

(65) Prior Publication Data

US 2024/0386366 A1 Nov. 21, 2024

(51) Int. Cl.
| | |
|---|---|
| *G06Q 10/08* | (2024.01) |
| *B64C 39/02* | (2023.01) |
| *B64D 1/02* | (2006.01) |
| *G05D 1/00* | (2006.01) |
| *G06Q 10/0832* | (2023.01) |
| *G06Q 10/0833* | (2023.01) |

(Continued)

(52) U.S. Cl.
CPC ....... *G06Q 10/0832* (2013.01); *B64C 39/024* (2013.01); *B64D 1/02* (2013.01); *G05D 1/1064* (2019.05); *G06Q 10/0833* (2013.01); *H04W 4/025* (2013.01); *B64U 2101/64* (2023.01); *B64U 2201/10* (2023.01)

(58) Field of Classification Search
None
See application file for complete search history.

(56) References Cited

U.S. PATENT DOCUMENTS

| | | |
|---|---|---|
| 9,573,684 B2 | 2/2017 | Kimchi et al. |
| 10,078,330 B2 | 9/2018 | Bhageria et al. |
| 10,216,188 B2 | 2/2019 | Brady et al. |
| (Continued) | | |

FOREIGN PATENT DOCUMENTS

| | | |
|---|---|---|
| CN | 110850865 B | 8/2022 |
| EP | 3504673 A1 | 7/2019 |
| EP | 3682191 A2 | 7/2020 |

OTHER PUBLICATIONS

Aline Karak, Khaled Abdelghany, The hybrid vehicle-drone routing problem for pick-up and delivery services, Transportation Research Part C: Emerging Technologies, vol. 102, pp. 427-449 (Year: 2019).*

*Primary Examiner* — Daniel Vetter
*Assistant Examiner* — Christopher Gomez
(74) *Attorney, Agent, or Firm* — Perkins Coie LLP

(57) ABSTRACT

This document describes techniques, apparatuses, and systems for autonomous delivery to a dynamic location. A user requests delivery of an item. An autonomous vehicle carrying the item navigates to a delivery location associated with the request. While navigating the autonomous vehicle toward the delivery location, the autonomous vehicle receives one or more estimates of a current location of a wireless device of the user. In response to receiving a respective estimate, the autonomous vehicle updates the delivery location to match the respective estimate of the current location of the wireless device. In this way, the delivery location can be dynamically updated as the user changes location. Once the autonomous vehicle reaches the delivery location, the item can be delivered to the user.

20 Claims, 5 Drawing Sheets

(51) Int. Cl.
  *H04W 4/02*    (2018.01)
  *B64U 101/64*  (2023.01)

(56) References Cited

U.S. PATENT DOCUMENTS

| | | |
|---|---|---|
| 10,514,690 B1 | 12/2019 | Siegel et al. |
| 11,074,540 B2 | 7/2021 | Sweeney et al. |
| 11,093,892 B2 | 8/2021 | Bostick et al. |
| 11,125,563 B2 | 9/2021 | Baratz et al. |
| 11,144,057 B1 | 10/2021 | Ebrahimi Afrouzi et al. |
| 11,216,755 B2 | 1/2022 | Leary et al. |
| 11,378,968 B2 | 7/2022 | Velten et al. |
| 11,656,636 B1* | 5/2023 | McDonald .............. B64U 10/13 701/2 |
| 2016/0196525 A1* | 7/2016 | Kantor .................. G08G 5/0043 705/330 |
| 2016/0196756 A1* | 7/2016 | Prakash ................. B64U 70/95 701/3 |
| 2017/0233071 A1* | 8/2017 | Pilskalns .............. G08G 5/0013 701/2 |
| 2018/0024554 A1* | 1/2018 | Brady .................... G06Q 10/08 701/23 |
| 2019/0206264 A1* | 7/2019 | Todasco ................ G08G 5/0069 |
| 2019/0207959 A1 | 7/2019 | Winkle et al. |
| 2019/0367278 A1 | 12/2019 | Bellar et al. |
| 2020/0219059 A1* | 7/2020 | Gillen ..................... G01S 19/14 |
| 2020/0364655 A1 | 11/2020 | Burris et al. |
| 2021/0356279 A1 | 11/2021 | Szigeti |
| 2022/0198373 A1* | 6/2022 | Rauhala ................ H04L 9/0894 |

\* cited by examiner

AUTONOMOUS DELIVERY TO A DYNAMIC LOCATION

BACKGROUND

Modern businesses implement autonomous delivery to provide added flexibility to their customers with reduced cost. For example, grocery stores and carryout restaurants utilize autonomous vehicles (AVs) to deliver food to their customers without requiring the customers to leave home or work, which can increase the likelihood that the customer orders from the store or restaurant. Moreover, the use of AVs can reduce the cost of delivery services by eliminating the need for human delivery drivers. Autonomous delivery has similarly been implemented in other areas, such as e-commerce, to reduce the cost of delivery services.

BRIEF DESCRIPTION OF THE DRAWINGS

Detailed descriptions of implementations of the present invention will be described and explained through the use of the accompanying drawings.

Figure 1:
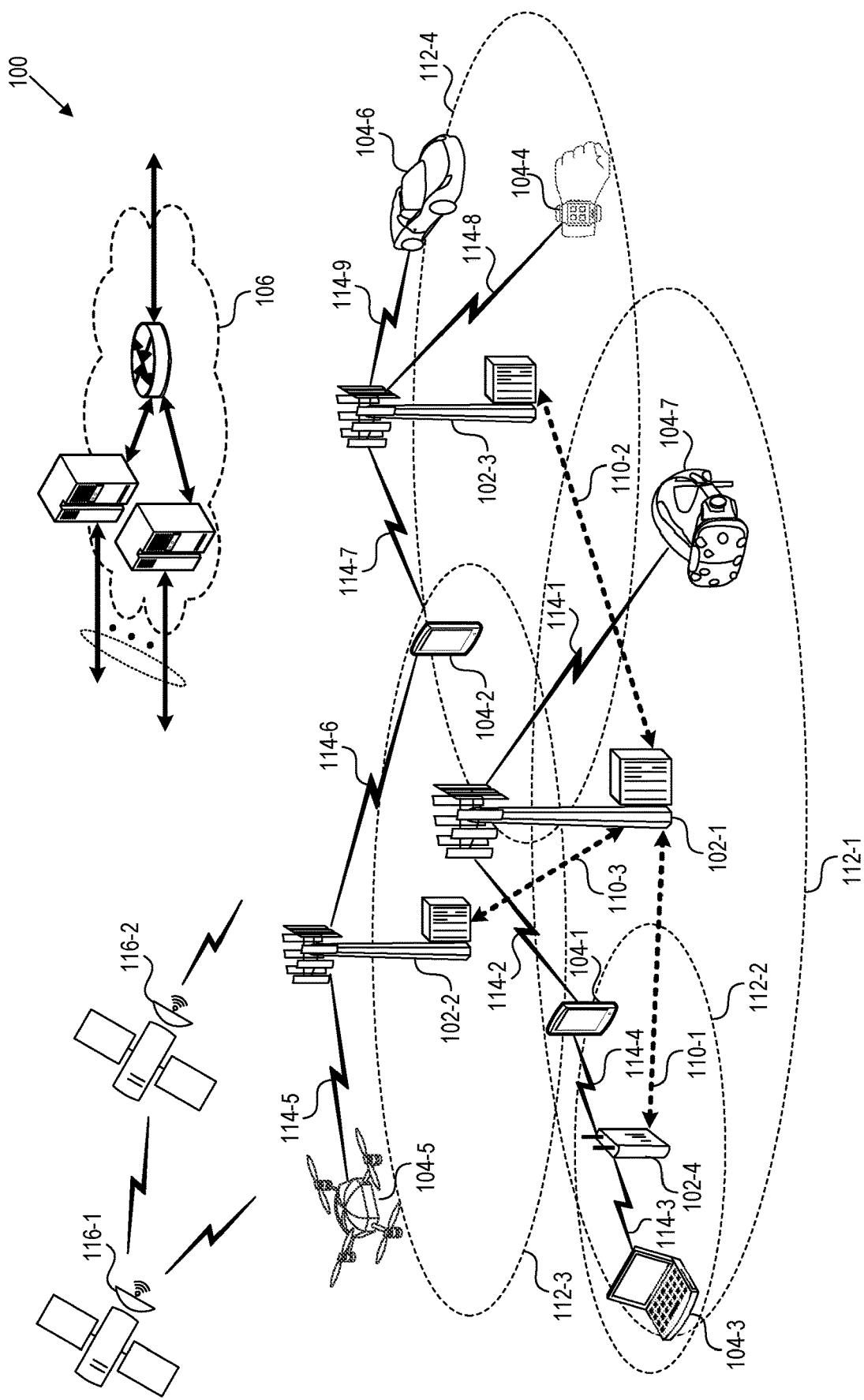
FIG. 1 illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Autonomous delivery has applications in many industries, including restaurants, grocery stores, e-commerce, healthcare, and more. For example, a business can deliver an item to a user instead of requiring that user to physically travel to the business to retrieve the item. In general, deliveries are directed to a static location, such as a residential or commercial address, that is identified as the delivery location before the delivery of the item is initiated. An AV can deliver the item to a package area at the delivery location. For example, some residential or commercial properties include a package receptacle that can accept an item delivered by an AV and store the item in a secure location until the user returns to their residence or work to retrieve the package. In doing so, the AV is not required to be aware of the user's location because the item is not directly delivered to the user but instead to their residence or work.

As delivery services increase in delivery speed and flexibility, situations exist where a user desires an item to be delivered directly to them while they are away from their home or office—for example, while they are running errands or watching an entertainment event. In these situations, the user may not know where they will be at the time of delivery and thus cannot provide a static delivery location for the item. Moreover, delivery to a static location may limit the mobility of the user and force the user to have to alter their plans to arrive at the static location at a delivery time to receive the item. Accordingly, additional solutions are needed to enable autonomous delivery of an item directly to a user.

The present technology provides such solutions and provides other benefits by describing techniques, apparatuses, and systems for autonomous delivery to a dynamic location. Take, for example, a situation in which a user places an order for an item on an e-commerce platform and requests delivery of the item. In response to the order, the e-commerce platform can coordinate a delivery of the item from a warehouse in which the item is located to a delivery location at which the user can receive the item. In contrast to other delivery services, the present technology enables the item to be delivered directly to the user rather than to a static address associated with or provided by the user. To deliver the item, an AV, such as a drone or automobile, can carry the item to a delivery location associated with the order. Initially, the delivery location can be set to a static delivery location provided when ordering the item or an initial location of a wireless device (e.g., smartphone, laptop, tablet, wearable, vehicle, and so on) associated with the user. During the delivery, the AV can receive an updated current location of the wireless device, thereby allowing the AV to be rerouted to an updated delivery location (if the user previously or currently requests delivery to be updated). In this way, the delivery location can be dynamically updated as the user changes location. Once the autonomous vehicle reaches the delivery location, the item can be delivered to the user.

The current location of the wireless device can be received through any number of techniques. For example, the AV can have wireless communication capabilities that enable the AV to communicate, through a wireless network, with a remote server that hosts data related to the current location of the user device. The data can be stored in the remote server in response to location updates from the user device. The AV can query the remote server for the data related to the current location of the user device prior to or during the delivery of the item. As a specific example, the data related to the current location can be communicated to or received from the remote server using a wireless communication network, such as a 5G network, operated by a mobile network operator. Many wireless communication networks require monitoring the position of connected devices. Thus, autonomous delivery to a dynamic location can be implemented by leveraging existing communication networks.

In some cases, the AV and the wireless device can communicate through peer-to-peer communication without leveraging a backend of the wireless network. For example, when the AV navigates within a communication range of the wireless device, the wireless device can communicate its current location to the AV through peer-to-peer communication. Thus, the AV can receive the updated delivery location of the item delivery exclusive of the backend of the wireless network.

As discussed above, autonomous delivery has become increasingly prevalent, resulting in the possibility of multiple AVs colliding with one another. Accordingly, there is a need to route the AV to the delivery location without colliding with other AVs. To do so, the AV can utilize the wireless network to transmit its current location at different times. The current location of the AV can be stored in a remote server that can be accessed by other AVs. The other AVs can similarly transmit their location to the remote server using the wireless network. The AV can retrieve the location of the other AVs from the remote server and navigate to the delivery location while being mindful of the location of the other AVs. Alternatively or additionally, the AV can broadcast its location to the other AVs independent of a backend of the wireless network and vice versa. For example, the AV can broadcast its location through vehicle-to-vehicle (V2V) or vehicle-to-everything (V2X) communication.

In some cases, routing of the AV to the delivery location can be performed at a routing system different than the AV. For example, the routing system can receive the current location of the wireless device, determine a path to the current location of the wireless device, and transmit one or more location points to the AV that define the path to the current location of the wireless device. In response to receiving the location points, the AV can navigate along the path defined by the location points until the current location of the wireless device is reached or the path is changed based on an updated current location of the wireless device. One advantage of performing routing at the routing system is that the routing system can determine the path of the AV such that the AV does not collide with one or more other AVs having a location to which the routing system is aware. For example, the routing system can receive the locations or routes of the other AVs and determine the route for the AV to the delivery location based on the locations or routes of the other AVs.

Another challenge that must be considered when delivering an item directly to a user is ensuring that the correct user receives the item. For example, many users can be located at the delivery location, or the user may not be prepared to accept delivery of the item. The AV can receive an indication that the user desires the item to be delivered to their current location instead of a static address. The AV can then be routed to the current location of a wireless device in response to receiving the indication. When the AV reaches the current location, the AV can receive confirmation that the user accepted receipt of the item through the wireless device before releasing the item. For example, the wireless device can be used to input an acceptance to receive the item when the wireless device is logged into a user account associated with the user. Once the AV delivers the item to the user, the AV can transmit a confirmation of the delivery using the wireless device.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, IP connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT) (e.g., narrow-band IoT (NB-IoT)), mobile broadband (MBB), V2X, machine-to-machine (M2M), machine-to-everything (M2X), ultra-reliable low-latency communication (URLLC), machine-type communication (MTC), etc.).

The network 100 can include a 5G network and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100, including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions, while the uplink transmissions can also be called reverse link transmissions. Each communication link 114 includes one or more carriers, where each carrier can be a signal composed of multiple subcarriers (e.g., waveform signals of different frequencies) modulated according to the various radio technologies. Each modulated signal can be sent on a different subcarrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service (QOS) requirements and multi-terabits per second data transmission in the era of 6G and beyond, such as terabit-per-second backhaul systems, ultra-high definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

5G Core Network Functions

Figure 2:
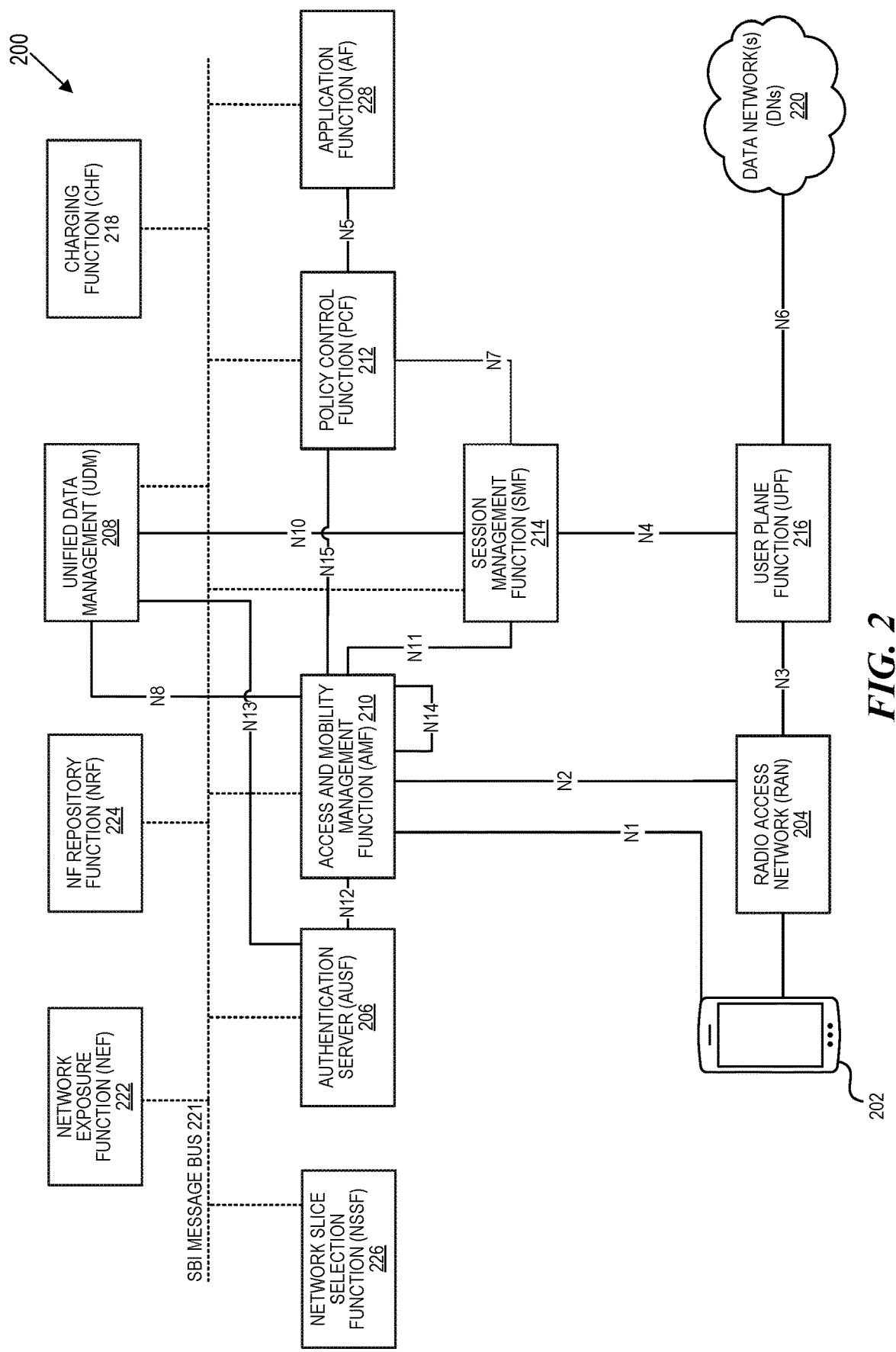
FIG. 2 illustrates 5G core network functions (NFs) that can implement aspects of the present technology.

FIG. 2 illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Autonomous Delivery to a Dynamic Location

Figure 3:
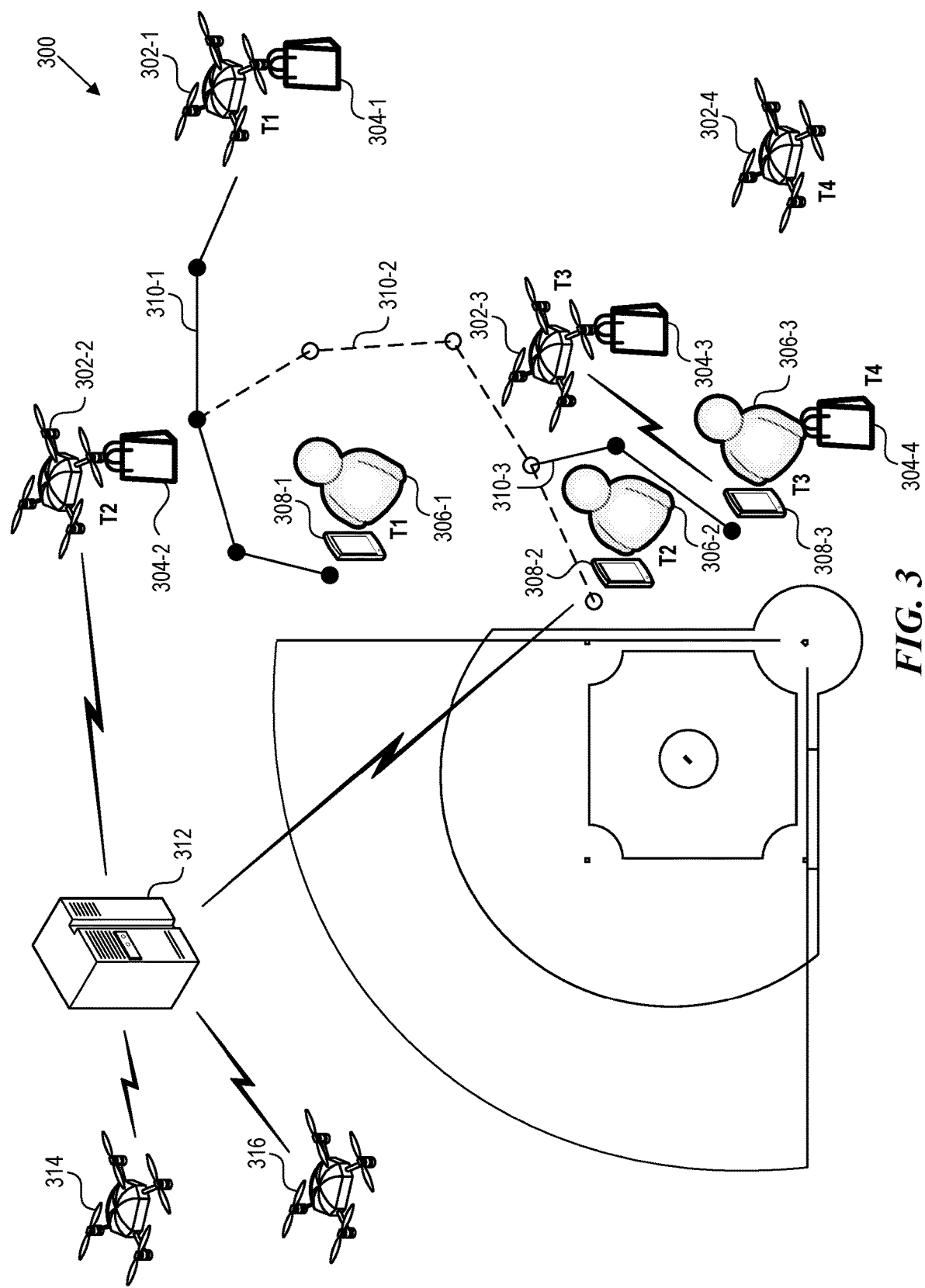
FIG. 3 illustrates an example operating environment in which aspects of the present technology can be implemented.

FIG. 3 illustrates an example operating environment 300 in which aspects of the present technology can be implemented. The operating environment 300 includes a drone 302 delivering an item 304 to the user 306 based on a current location of a wireless device 308 of the user 306. As illustrated, the user 306 is away from their home or office attending a baseball game. Although illustrated as the drone 302, the item 304 could instead be delivered by any other at least partially autonomous vehicle (e.g., an automobile, an airplane, a boat, and so on). The drone 302 can be used to perform an entire delivery service or a portion of the delivery service (e.g., last-mile delivery). The drone 302, item 304, user 306, and the wireless device 308 are illustrated at four times, T1, T2, T3, and T4. The drone 302 navigates along the route 310 to arrive at the delivery location. The drone 302 can receive updated estimates of the current location of the wireless device 308 at times T1, T2, and T3, which causes the route 310 to be updated. The drone 302, item 304, user 306, wireless device 308, and route 310 are illustrated at the respective times T1, T2, T3, and T4 using the suffixes-1, -2, -3, and-4, respectively.

The location estimates can be communicated through at least one remote server 312 using a wireless network (e.g., wireless network 100 of FIG. 1) or through peer-to-peer communication between the drone 302 and the wireless device 308. Other devices (e.g., drone 314, drone 316, and other at least partially autonomous devices) can share their location through the remote server 312 or through peer-to-peer communication. Although illustrated as a single remote server 312, the remote server 312 can include multiple remote servers. For example, a first remote server can host data indicative of the location of the wireless device 308, and a second remote server can host data indicative of the location of the drone 302, the drone 314, and the drone 316. Moreover, although only a few communication interfaces are shown (illustrated as lightning bolts), communication can occur between any of the devices at any time.

Beginning at time T1, the drone 302-1 initiates delivery of the item 304-1. In some cases, the user 306 can receive information (e.g., a notification) related to the status of the delivery of the item 304 (e.g., that the item is out for delivery, the estimated time of arrival, the current delivery location, static or dynamic delivery). The delivery can be initiated in response to a request from the user 306 to have the item 304 delivered. For example, the user 306 can order the item 304 from an e-commerce platform and request delivery of the item 304. The request can specify a delivery location for the item 304. For example, the delivery location can initially correspond to a delivery location provided when ordering the item 304 (e.g., a residential or commercial address or general geographic region). In other cases, the delivery location can correspond to a location of the wireless device 308-1 of the user 306-1 at time T1 when the drone 302-1 begins delivery of the item 304-1. For example, the current location of the wireless device 308-1 can be transmitted to the remote server 312, and the drone 302-1 can receive the current location of the wireless device 308-1 from the remote server 312 via the wireless network. In response to receiving the current location of the wireless device 308, the current location of the wireless device 308 can be stored as the delivery location. The user 306 can request that the item 304 be delivered to their dynamically changing location based on the location of their wireless device 308. Accordingly, the drone 302 can deliver the item based on the dynamic location of the wireless device 308.

In response to determining the delivery location at time T1, a route 310-1 is determined. The route 310-1 can be defined by one or more location points (illustrated as solid points) through which the drone 302-1 travels to reach the delivery location. In some cases, the route 310-1 can be determined by the drone 302-1 based on the delivery location. In other cases, the drone 302-1 can receive the route 310-1, or the location points defining the route 310-1, through the wireless network. In aspects, the route 310-1 can be determined based on the locations or routes of the drone 314, drone 316, or other devices in the environment of the drone 302-1. The route 310-1 can be determined to avoid collisions with the drone 314, drone 316, or other devices or objects in the environment of the drone 302-1.

The drone 302 can continue to receive the location of the wireless device 308 or other devices (e.g., drone 314 and drone 316) while traveling along the route 310. For example, the drone 302 can receive the locations of the wireless device 308 or the other devices through the remote server 312 or through peer-to-peer communication using the wireless network. The location estimates or any other wireless communications can be communicated via cellular communication (2G, 3G, 4G, 5G, or future generations, such as 6G and so on), Wi-Fi, Bluetooth, near-field communication (NFC), Zigbee, long-range radio (LoRa), or any other communication technology. In aspects, the locations or any other wireless communication can be communicated via NB-IoT communications, which can leverage the existing wireless network and have advantageous attributes, such as increased reachability, low latency, and low power consumption.

Referring back to FIG. 3, the drone 302-1 navigates along the route 310-1 until a time T2, at which the user 306-2 has relocated. At time T2, the drone 302-2 receives a location estimate of the wireless device 308-2 through the wireless network. For example, the location estimate of the wireless device 308-2 can be received from the remote server 312. The location estimate is stored as the new delivery location such that the delivery location matches the location estimate. For example, the location estimate can be compared to the previous delivery location (e.g., the location of the wireless device 308-1 at time T1) to determine that the location estimate of the wireless device 308-2 is different from the previous delivery location. If so, the location estimate can be determined as the new delivery location. Alternatively, each new location estimate can be stored as the updated delivery location without having to compare the location estimate to the previous delivery location.

As a result of receiving the current location estimate of the wireless device 308-2 and updating the delivery location, the drone 302-2 determines an updated route 310-2 toward the updated delivery location (e.g., the location of the wireless device 308-2) and begins navigating the route 310-2 while carrying the item 304-2 (e.g., before completing the route 310-1). In aspects, the route 310-2 is defined by location points (illustrated as open circles) through which the drone 302-2 passes along the route 310-2. In some cases, the route 310-2 or the location points are determined by the drone 302-2. In other cases, the route 310-2 or the location points are communicated (e.g., through the wireless network) to the drone 302-2 from an external routing system. The route 310-2 can be determined with regard to the locations of other devices (e.g., drone 314 and drone 316) such that the drone 302-2 can travel to the delivery location without colliding with the other devices. Moreover, the route 310-2 can be updated to avoid the other devices in response to receiving additional data indicating the location of the other devices.

Continuing on, the drone 302-2 navigates along the route 310-2 until a time T3, at which point the drone 302-3 enters a communication range of the wireless device 308-3. As a result, the drone 302-3 can pair with the wireless device 308-3 such that the drone 302-3 and the wireless device 308-3 can communicate peer-to-peer. For example, the wireless device 308-3 can transmit its current location estimate to the drone 302-3. As a result, the drone 302-3 can update the delivery location to match the current location estimate of the wireless device 308-3. Moreover, a new route 310-3 (e.g., defined by location points (illustrated as points)) to the updated delivery location is determined. The drone 302-3 then navigates along the route 310-3 toward the delivery location (e.g., before completing the route 310-2) while carrying item 304-3.

The drone 302-3 navigates along the route 310-3 until a time T4, at which point the drone 302-4 reaches the delivery location (e.g., the location of the wireless device 308-3). Once the drone 302-4 reaches the delivery location, the user 306-3 can be prompted to accept delivery of the package. For example, a notification requesting the user 306-3 to accept delivery of the item 304-4 can be sent to the wireless device 308-3. The user 306-3 can accept delivery through the wireless device 308-3. The drone 302-4 can receive an indication that the user 306-3 accepted delivery of the item 304-4 (e.g., through peer-to-peer communication or through the remote server 312). In response, the drone 302-4 can release the item 304-4 at the delivery location. In some cases, the drone 302-4 can transmit a confirmation of the delivery to the wireless device 308-3 or the remote server 312. Once the drone 302-4 delivers the item 304-4, the drone 302-4 can return to a warehouse or docking station to receive further instructions.

Although not illustrated, the drone 302 can lose wireless connectivity (e.g., peer-to-peer connectivity or wireless connectivity with the remote server 312) during navigation along the route 310. In some cases, the drone 302 can continue along the route 310 when connectivity is lost. In other cases, the drone 302 can return to a last known point of connectivity along the route 310 to determine a new route that does not pass through the wirelessly disconnected region. In yet other aspects, the drone 302 can return to the location at which the delivery began (e.g., a warehouse from which the item 304 was retrieved). In some embodiments, the drone 302 can determine locations at which it is likely to lose wireless connectivity. In this way, locations with no wireless connectivity can be avoided. Alternatively or additionally, the drone 302 can land on a different vehicle (e.g., an automobile, airplane, train, boat, or other drone) that carries the drone through the region with no wireless connectivity until the drone 302 reaches a location at which wireless communication is possible. At this point, the drone 302 can determine the route 310 to the delivery location and navigate the route 310.

Although various communications are described as peer-to-peer or through the remote server 312, location estimates can be communicated through any appropriate communication technology. For example, the various location estimates can be communicated to/from the remote server 312 using the wireless network, through peer-to-peer communication, or both. In some cases, the locations of the wireless device 308, the drone 302, or any other devices (e.g., drone 314 and drone 316) are communicated through NB-IoT communication. In this way, it should be appreciated that although a particular implementation is illustrated and described, the drone 302 can receive more or fewer location estimates from the wireless device 308 or other devices through any appropriate wireless communication technology. For example, the route 310 can be updated 1, 3, 4, 5, 10, 20, 30, or any other number of times in response to location updates from the wireless device 308 or any other devices.

Moreover, various location estimates are determined and transmitted/received. The various location estimates can be transmitted through any number of techniques. For example, one or more of the various location estimates can be transmitted using a Global Navigation Satellite System (GNSS). In some cases, the location estimates can be determined using triangulation (e.g., from one or more base stations). In some cases, the location estimates can be determined with an uncertainty of less than 1 foot, 1 meter, 5 meters, 10 meters, and so on. In some cases, providing the location estimates requires no additional location determination beyond those required for cellular communication (e.g., 5G communication). In this way, the location estimates can be location estimates associated with other wireless communication operations (e.g., calls, texts, or data requests). In some cases, millimeter wave positioning can be used to determine the location estimate with an uncertainty of less than 1 or 2 meters. Although various possibilities for the location estimates are described, it is appreciated that other possibilities exist that could be used to determine the position of any of the various devices (e.g., drone 302, wireless device 308, drone 314, and drone 316).

Figure 4:
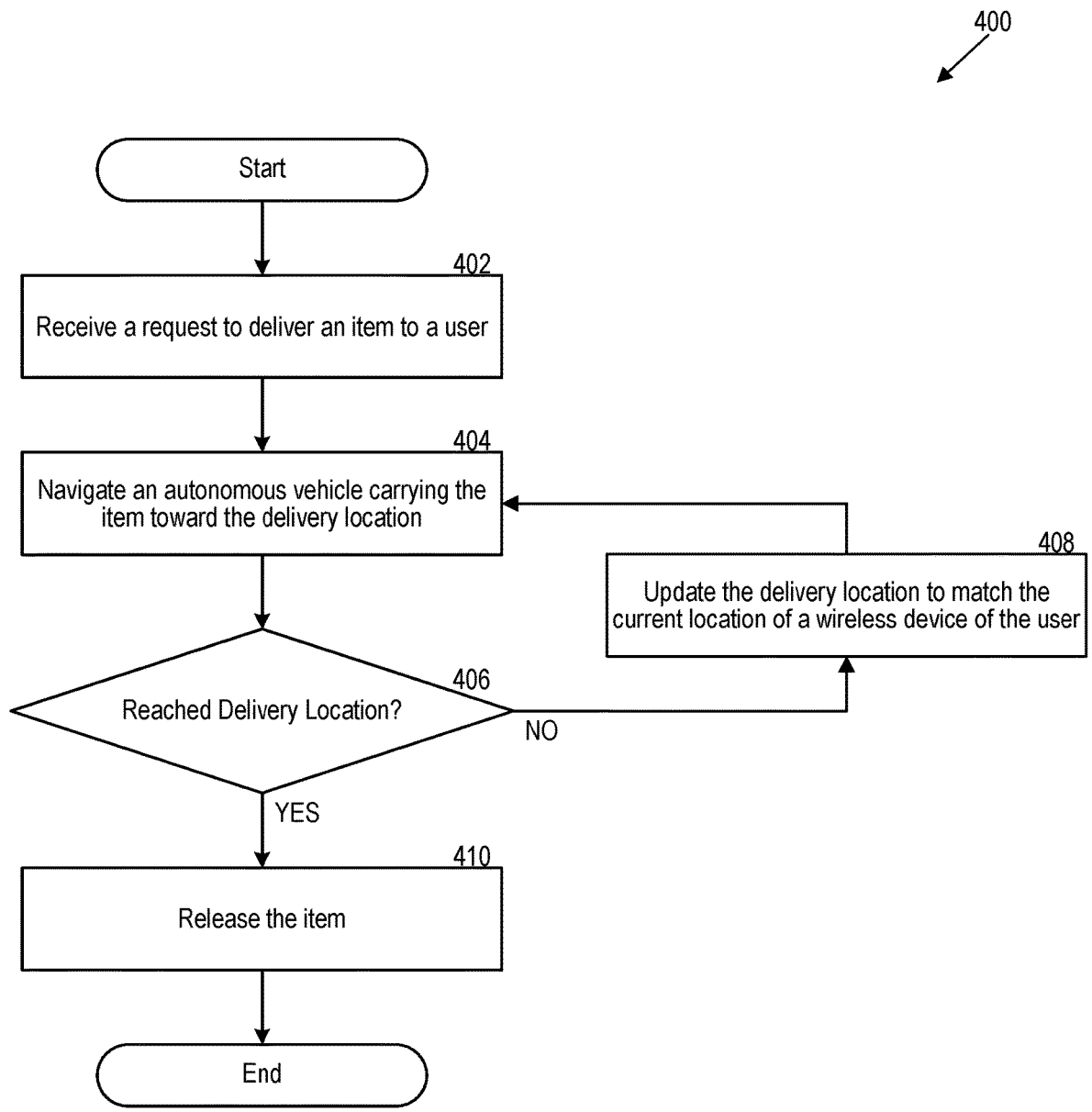
FIG. 4 illustrates an example method in accordance with aspects of the present technology.

FIG. 4 illustrates an example method 400 in accordance with aspects of the present technology. The method 400 can be performed by a control system of an AV (e.g., drone) delivering an item. The control system can be integrated with the AV or a remote control system capable of communicating with the AV through a wireless network. In this way, the method 400 can be performed by issuing commands to the AV.

At 402, a request to deliver an item to a user is received. The request can include a delivery location at which the user requests to receive the item. For example, the delivery location can include an address within a general area of the user (e.g., a residential or commercial address). Alternatively or additionally, the delivery location can be a current location of a wireless device of the user at the time the delivery process is initiated. The request can be received from a wireless device of the user or from a business that utilizes the delivery service. As a specific example, a user can order an item for delivery from an e-commerce platform. Once the order is processed, the item can be delivered to the user. The user can request dynamic delivery of the item, for example, based on the location of the wireless device.

At 404, responsive to receiving the request, an AV carrying the item is navigated toward the delivery location. For example, the AV can determine a route to the delivery location. The route can avoid one or more other vehicles or objects in an environment of the AV. In aspects, the AV can communicate its location while navigating toward the delivery location such that other devices can be aware of the AV's location. In contrast to other delivery services, the AV can provide dynamic delivery that enables the delivery location or the route to the delivery location to change over time.

For example, at 406, if the AV has not reached the delivery location, the AV can continue navigating along the route toward the delivery location. If a current location estimate of the wireless device is received (e.g., from a remote server or through peer-to-peer communication), at 408, the delivery location can be updated to match the current location of the wireless device. As a result, the route can be updated such that the route is directed toward the updated delivery location. Once the route is updated, the AV can navigate along the updated route toward the updated delivery location. Moreover, the AV can receive the location of other vehicles or objects within an environment of the AV. When the locations of other vehicles or objects are received, the route of the AV to the delivery location can be updated to prevent collisions with these vehicles or objects.

Once the AV reaches the delivery location at 406, the method 400 can continue at 410, where the item is released. For example, the AV can release the item into the possession of the user. In aspects, the AV can receive an indication that the user has accepted delivery of the item (e.g., using their wireless device, which is authenticated into a user account of the user) prior to releasing the item. In this way, the item is delivered to the user with higher confidence. In some cases, the AV can send a confirmation of the delivery to the wireless device or to a remote server associated with a provider of the delivery service.

Computer System

Figure 5:
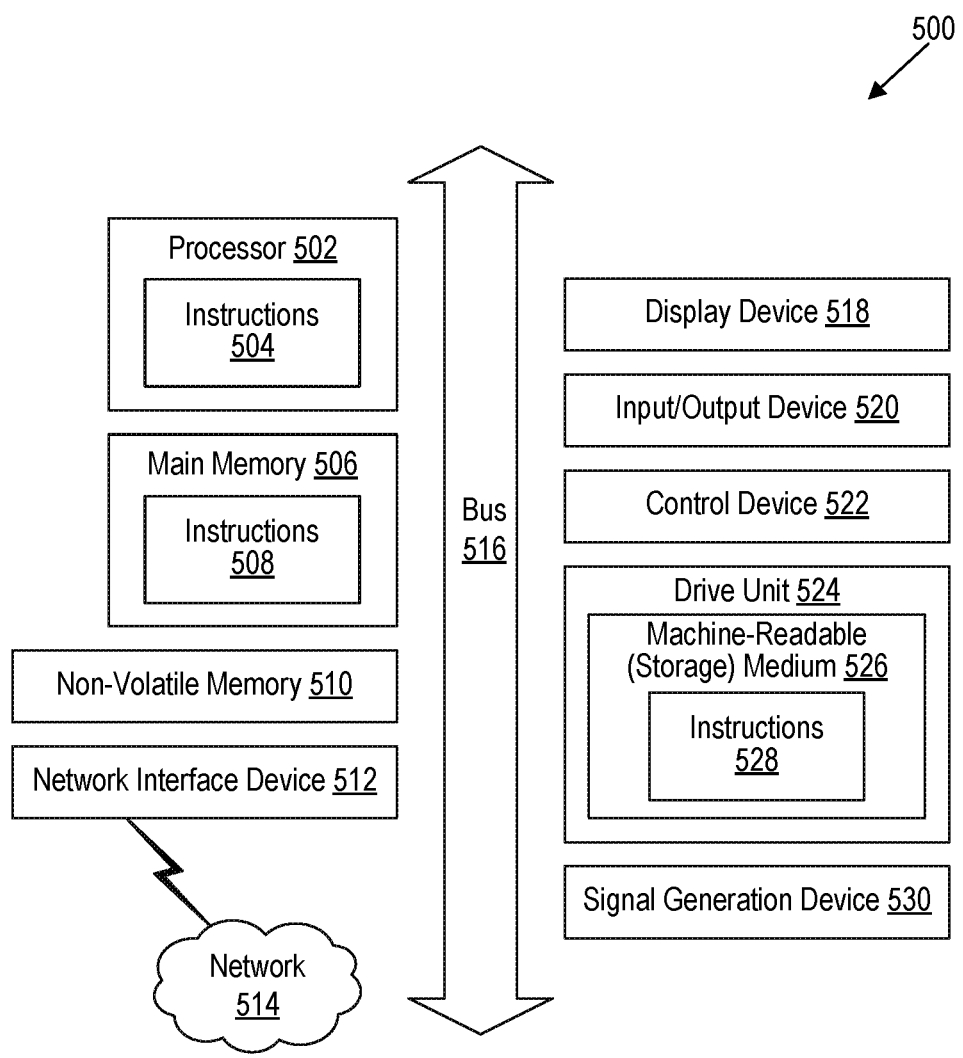
FIG. 5 illustrates an example computer system in which at least some aspects of the present technology can be implemented.

FIG. 5 illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, which stores instructions 528 to be executed by the one or more processors 502, and a signal generation device 550 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computer system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 500. In some implementations, the computer system 500 can be an embedded computer system, a system-on-chip (SOC), a single-board computer system (SBC), or a distributed system, such as a mesh of computer systems, or can include one or more cloud components in one or more networks. Where appropriate, one or more computer systems 500 can perform operations in real time, in near real time, or in batch mode.

The network interface device 512 enables the computer system 500 to mediate data in a network 514 with an entity that is external to the computer system 500 through any communication protocol supported by the computer system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computer system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, and 528) set at various times in various memory and storage devices in computing device(s). When read and executed by the processor 502, the instruction(s) cause the computer system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense-that is to say, in the sense of "including, but not limited to." As used herein, the terms "connected," "coupled," and any variants thereof mean any connection or coupling, either direct or indirect, between two or more elements; and the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. At least one non-transitory, computer-readable medium carrying instructions, which when executed, performs operations for autonomous delivery of an item, the operations comprising:
    receiving a request to deliver the item from a first location to a second location,
        wherein the item is associated with a user that requested delivery of the item;
    responsive to receiving the request, navigating a drone carrying the item along at least a portion of a route from the first location to the second location,
        wherein the route passes through an area in which loss of wireless connectivity is expected;
    responsive to navigating the drone along at least the portion of the route and prior to reaching the area in which loss of wireless connectivity is expected, navigating the drone carrying the item to land on a vehicle traveling through the area in which loss of wireless connectivity is expected;
    receiving, via a wireless network, a current location of a user device and a current location of at least one other drone within an environment of the drone;
    responsive to receiving the current location of the user device and after the drone has traveled through the area in which loss of wireless connectivity is expected, navigating the drone along at least a portion of an updated route toward the current location of the user device and avoiding the at least one other drone based on the current location of the user device and the current location of the at least one other drone;
    responsive to navigating along at least the portion of the updated route to a third location within a communication range of the user device, receiving, from the user device, an updated current location of the user device;
    responsive to receiving the updated current location of the user device, navigating the drone to the updated current location; and
    responsive to navigating the drone to the updated current location, releasing the item.

2. The at least one non-transitory, computer-readable medium of claim 1, wherein the operations further comprise:
    receiving, via the wireless network, multiple navigation points defining at least the portion of the updated route; and
    navigating along at least the portion of the updated route defined by the multiple navigation points.

3. The at least one non-transitory, computer-readable medium of claim 1, wherein the operations further comprise, responsive to navigating the drone along at least the portion of the route, transmitting, via the wireless network, a current location of the drone to a remote server accessible by the at least one other drone.

4. The at least one non-transitory, computer-readable medium of claim 1, wherein the operations further comprise:
    receiving an indication that the user device has transmitted an acceptance of delivery of the item at the updated current location,
    wherein releasing the item is responsive to receiving the indication.

5. The at least one non-transitory, computer-readable medium of claim 1, wherein the operations further comprise:
    transmitting, via the wireless network, a request to retrieve the current location of the user device from a first remote server; and
    transmitting, via the wireless network, a request to retrieve the current location of the at least one other drone from a second remote server,
    wherein the current location of the user device is received in response to the request to retrieve the current location of the user device, and
    wherein the current location of the at least one other drone is received in response to the request to retrieve the current location of the at least one other drone.

6. The at least one non-transitory, computer-readable medium of claim 1, wherein the updated current location is received via peer-to-peer communication.

7. The at least one non-transitory, computer-readable medium of claim 1, wherein the current location or the updated current location is received via narrow-band Internet-of-Things (NB-IoT) communication.

8. A system comprising:
    at least one processor; and
    at least one non-transitory, computer-readable storage medium storing instructions, which, when executed by the at least one processor, cause the at least one processor to:
        receive a request to deliver an item to a first location,
            wherein the item is associated with a user that requested delivery of the item, and
            wherein a delivery location of the item initially corresponds to the first location;
        responsive to receiving the request, navigate an autonomous vehicle carrying the item toward the delivery location,
            wherein the autonomous vehicle is routed to pass through an area in which loss of wireless connectivity is expected;

while navigating the autonomous vehicle toward the delivery location:
receive, from a remote server, one or more estimates of a current location of a wireless device, wherein the current location is not collocated with the first location; and
responsive to receiving a respective location estimate of the one or more estimates, update the delivery location to the respective location estimate;
prior to reaching the area in which loss of wireless connectivity is expected, navigating the autonomous vehicle carrying the item to land on a vehicle traveling through the area in which loss of wireless connectivity is expected; and
after traveling through the area in which loss of wireless connectivity is expected, continuing to navigate the autonomous vehicle toward the delivery location; and
responsive to the autonomous vehicle arriving at the updated delivery location, release the item.

9. The system of claim 8, wherein the processor is further caused to:
while navigating the autonomous vehicle toward the delivery location, receive one or more additional estimates of a current location of an additional device within an environment of the autonomous vehicle,
wherein navigating the autonomous vehicle toward the delivery location includes navigating the autonomous vehicle to avoid the additional device based on a most recent estimate of the one or more additional estimates.

10. The system of claim 8, wherein the processor is further caused to:
responsive to receiving the respective estimate of the one or more estimates:
determine whether the respective estimate is different from the delivery location; and
responsive to determining that the respective estimate is different from the delivery location, update the delivery location to correspond to the respective estimate.

11. The system of claim 8, wherein processor is further caused to, while navigating the autonomous vehicle toward the delivery location, transmit one or more additional estimates of a current location of the autonomous vehicle.

12. The system of claim 8, wherein the processor is further caused to:
responsive to receiving the request, receive a first set of locations,
wherein navigation points that define a route toward the delivery location correspond to the first set of locations; and
responsive to receiving the respective estimate of the one or more estimates:
receive a second set of locations that define a route toward the respective estimate; and
update the navigation points to correspond to the second set of locations,
wherein navigating the autonomous vehicle toward the delivery location comprises navigating the autonomous vehicle along a path defined by the navigation points.

13. The system of claim 8, wherein the processor is further caused to:
while navigating the autonomous vehicle toward the delivery location:
receive a request to deliver the item to a static location; and
responsive to receiving the request to deliver the item to the static location, update the delivery location to the static location.

14. The system of claim 8, wherein at least some of the one or more estimates are received via narrow-band Internet-of-Things (NB-IoT) communication.

15. The system of claim 8, wherein the processor is further caused to:
navigate the autonomous vehicle within a communication range of the wireless device;
responsive to navigating the autonomous vehicle within the communication range of the wireless device, receive, from the wireless device and exclusive of the remote server, one or more additional estimates of the current location of the wireless device; and
responsive to receiving a respective additional estimate of the one or more additional estimates, match the delivery location to the respective additional estimate.

16. At least one non-transitory, computer-readable storage medium storing instructions, which, when executed by at least one processor, cause the at least one processor to:
receive a request to deliver an item to a first location,
wherein the item is associated with a user that requested delivery of the item, and
wherein a delivery location of the item initially corresponds to the first location;
responsive to receiving the request, navigate an autonomous vehicle carrying the item toward the delivery location,
wherein the autonomous vehicle is routed to pass through an area in which loss of wireless connectivity is expected;
while navigating the autonomous vehicle toward the delivery location:
receive, via a wireless network, one or more estimates of a current location of a wireless device;
responsive to receiving a respective estimate of the one or more estimates, match the delivery location to the respective estimate;
prior to reaching the area in which loss of wireless connectivity is expected,
navigate the autonomous vehicle carrying the item to land on a vehicle traveling through the area in which loss of wireless connectivity is expected; and
after traveling through the area in which loss of wireless connectivity is expected,
continue to navigate the autonomous vehicle toward the delivery location; and
responsive to the autonomous vehicle arriving at the delivery location, release the item.

17. The at least one non-transitory, computer-readable storage medium of claim 16, wherein the processor is further caused to:
while navigating the autonomous vehicle toward the delivery location, receive one or more additional estimates of a current location of an additional device within an environment of the autonomous vehicle,
wherein navigating the autonomous vehicle toward the delivery location includes navigating the autonomous vehicle to avoid the additional device based on a most recent estimate of the one or more additional estimates.

18. The at least one non-transitory, computer-readable storage medium of claim 16, wherein the processor is further caused to:
responsive to receiving the request, receive a first set of locations, wherein navigation points that define a route toward the delivery location correspond to the first set of locations; and responsive to receiving the respective estimate of the one or more estimates:

receive a second set of locations that define a route toward the respective estimate; and update the navigation points to correspond to the second set of locations, wherein navigating the autonomous vehicle toward the delivery location comprises navigating the autonomous vehicle along a route defined by the navigation points.

19. The at least one non-transitory, computer-readable storage medium of claim 16, wherein the processor is further caused to:

navigate the autonomous vehicle within a communication range of the wireless device;

responsive to navigating the autonomous vehicle within the communication range of the wireless device, receive, from the wireless device and via peer-to-peer communication, one or more additional estimates of the current location of the wireless device; and responsive to receiving a respective additional estimate of the one or more additional estimates, match the delivery location to the respective additional estimate.

20. The at least one non-transitory, computer-readable storage medium of claim 16, wherein the processor is further caused to transmit an indication of delivery of the item in response to releasing the item.

\* \* \* \* \*